UNITED STATES PATENT OFFICE.

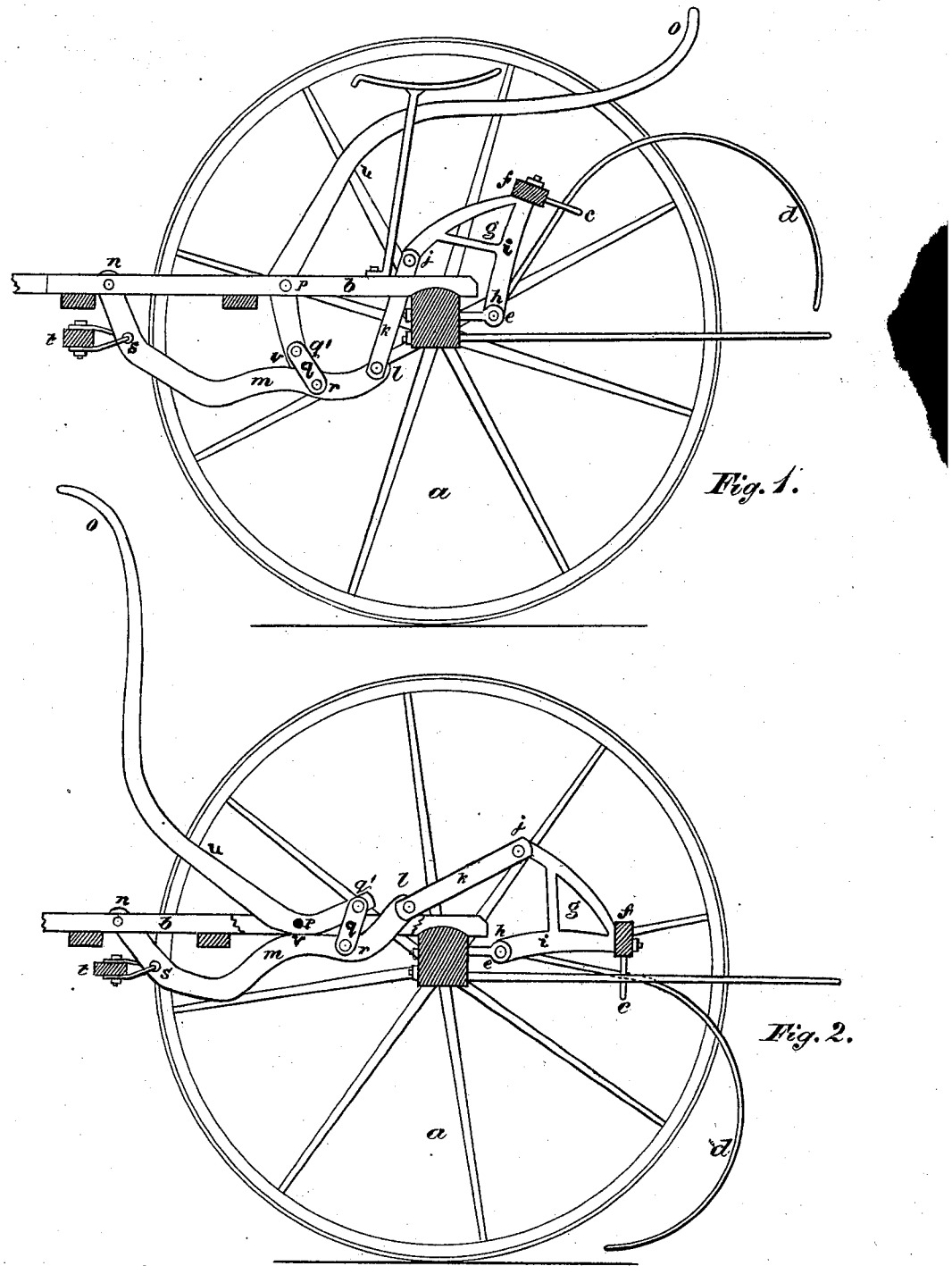

CHARLES M. TITUS AND LYNFRED MOOD, OF ITHACA, NEW YORK; SAID MOOD ASSIGNOR TO SAID TITUS.

IMPROVEMENT IN HORSE-RAKES.

Specification forming part of Letters Patent No. 132,741, dated November 5, 1872.

*To all whom it may concern:*

Be it known that we, CHARLES M. TITUS and LYNFRED MOOD, of Ithaca, in the county of Tompkins and State of New York, have invented certain Improvements in Horse-Rakes, of which the following is a specification:

The invention relates mainly to the dumping of a horse-rake, and has reference to two parts of the rake—first, to the hand-lever; and, secondly, to the use of the power of the horse in combination with the hand-lever; and the nature of our devices and of our invention will be apparent as we describe our improvements.

Figure 1 is a side, partially sectional, view of a rake with our dumping device, showing the rake dumped; and Fig. 2, the same repeated, with the rake in position for raking.

In Fig. 1, $a$ is one of the wheels that support the rake; and $b$, the thills and other parts of the draft-frame and axle; and $d$, the rake-teeth hinged at $e$ in rear of the axle; and they are lifted by the staples $c$, which are fast to the lifting and pressure bar $f$, which is held to the axis of the head $h$ by the rods $i$, from one of which the frame piece $g$ projects, to which, at $j$, is hinged the connecting-link $k$, which link, at $l$, is hinged to the main bar $m$, and which bar is fast, by its pivot or hinge, at $n$, to the frame-work of the rake. At $o$ is the hand-lever, which is hinged at $p$, and lower down is also hinged, at $q$, to the link $q$, which link is also hinged, at $r$, to the bar $m$.

The hand-lever $o$ is represented as thrown, by the operator of the rake, backward to its full extent, and its action has been to depress the bar $m$; and as it depressed it, by the metallic piece $q$ the lifting-bar $f$ and the teeth $d$ were raised so that the strippers have cleared the teeth of their load, and the rake has been dumped.

It will also be noticed that in the bar $m$, at $s$, is a connection for the whiffletree, and also an angle, so that before the hand-lever $o$ begins, in dumping the rake, to depress the bar $m$, the whiffletree is back at its rearward place of movement, and the bar $m$ then is, in its general direction, nearest to a straight line with the whiffletree and the link $k$ and lifting-bar $f$; and that as the hand-lever $o$ depresses the bar $m$ the position of the bar $m$ between $n$ and $s$ becomes more and more perpendicular, and thus more favorable for a stronger draft of the horse, as it is desirable it should do, the draft increasing constantly through the bar $m$ on the teeth $d$ until the rake is dumped—thus admirably aiding in dumping of the rake.

In the second figure the same parts are seen by the same letters. The lever $o$ is, however, forward, and the foot of the operator of the rake is on it, at $u$, thus holding the teeth to their work. When the parts are in this position the flexure $v$ of the bar $m$ bears on the flexure, at $p$, of the hand-lever, thus controlling the upward raising of the bar.

At $q'$ is seen the end of the hand-lever $o$, which, when the rake is dumped, touches, at $v$, the bar $m$, thus controlling the downward depression of the bar $m$, and consequently the lifting upward of the rake-teeth, as seen in Fig. 1.

The action, uses, and advantages of our invention are apparent to those skilled in the art to which it appertains.

Claims.

1. We claim the bar $m$, pivoted at $n$ to the draft-frame $b$, and connected by pivots or hinges with the rake-head $h$, and having the whiffletree attached at $s$, substantially as set forth.

2. The bar $m$, pivoted to the draft-frame at $n$, and connected by pivots or hinges with the rake-head $h$, and having the hand-lever $o$ connected at $r$, as and for the purpose set forth.

3. The bar $m$, pivoted and connected as described, when constructed and arranged with both the whiffletree and the hand-lever, substantially as set forth, as a means of dumping the rake by the double action of the horse and hand lever, as described.

4. The elongated end $q'$ of the lever $o$ in combination with the flexure *v* of the bar *m*, for the purpose of checking the rearward motion of the lever *o*, as described.

5. The combination, consisting of the pivoted and connected bar *m*, with flexure at *s* for the whiffletree-link, the flexure *v* for checking the lifting of the bar *m* by contact with the lever *o*, the hinging-link *k*, the lever *o*, the frame *g i* connecting to the lifting-bar *f* and rake-head *h*, substantially as set forth.

C. M. TITUS.
LYNFRED MOOD.

Witnesses:
S. J. PARKER,
A. M. LUCAS.